(12) United States Patent
Nozawa et al.

(10) Patent No.: US 8,674,267 B2
(45) Date of Patent: Mar. 18, 2014

(54) STEAM COOKER

(75) Inventors: Rika Nozawa, Osaka (JP); Toshiaki Ueki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/322,254

(22) PCT Filed: Jun. 10, 2010

(86) PCT No.: PCT/JP2010/059821
§ 371 (c)(1),
(2), (4) Date: Nov. 23, 2011

(87) PCT Pub. No.: WO2010/143678
PCT Pub. Date: Dec. 16, 2010

(65) Prior Publication Data
US 2012/0091118 A1    Apr. 19, 2012

(30) Foreign Application Priority Data
Jun. 11, 2009 (JP) .................... 2009-139722

(51) Int. Cl.
*A21B 1/00* (2006.01)

(52) U.S. Cl.
USPC ........................................ 219/401; 219/506

(58) Field of Classification Search
USPC .......... 219/400, 401, 506; 126/21 A, 20, 369; 99/417, 467
See application file for complete search history.

(56) References Cited

U.S. PATENT DOCUMENTS

| 4,096,369 | A | * | 6/1978 | Tanaka et al. | 219/741 |
| 4,426,923 | A | * | 1/1984 | Ohata | 99/468 |
| 4,695,711 | A | * | 9/1987 | McGeorge | 219/506 |
| 5,680,810 | A | * | 10/1997 | Sham | 99/330 |
| 6,232,587 | B1 | | 5/2001 | Kurita et al. | |
| 6,472,647 | B2 | * | 10/2002 | Lee et al. | 219/681 |
| 6,833,032 | B1 | | 12/2004 | Douglas et al. | |
| 2004/0149729 | A1 | * | 8/2004 | Kressmann | 219/494 |
| 2005/0081572 | A1 | * | 4/2005 | Park et al. | 68/12.02 |
| 2006/0216217 | A1 | * | 9/2006 | Chan et al. | 422/218 |

FOREIGN PATENT DOCUMENTS

| CN | 2030323 U | 1/1989 |
| CN | 1232534 A | 10/1999 |
| CN | 1506166 A | 6/2004 |
| DE | 195 41 719 A1 | 5/1997 |
| JP | 10-78224 A | 3/1998 |
| JP | 2004-138381 A | 5/2004 |
| JP | 2005-337627 A | 12/2005 |
| JP | 2008-157580 A | 7/2008 |

* cited by examiner

*Primary Examiner* — Henry Yuen
*Assistant Examiner* — John Wasaff
(74) *Attorney, Agent, or Firm* — Birch, Stewart, Kolasch & Birch, LLP

(57) ABSTRACT

A steam cooker includes: a heating chamber for an item to be cooked; a removable water tank; a steam generating device with a housing to which water is supplied from the water tank and that heats the water within the housing and supplies steam to the heating chamber. A hardness detection portion includes a plurality of electrodes immersed in water within the water tank that detect the hardness of the water within the water tank by resistance between the electrodes. When the hardness of the water within the water tank is high, the interval of cleaning is shorter than an interval set when the hardness detected is low.

4 Claims, 4 Drawing Sheets

STEAM COOKER

FIELD OF THE INVENTION

The present invention relates to a steam cooker that cooks, with steam, an item to be cooked.

DESCRIPTION OF THE RELATED ART

A conventional steam cooker is disclosed in patent document 1. This steam cooker includes a steam generating device for supplying steam to a heating chamber that stores an item to be cooked. In the steam generating device, a steam generating heater is provided within a housing to which water is supplied from a removable water tank. The housing is provided with a water level sensor that is formed with a self-heating heat-sensing element.

When the water tank in which tap water or the like is stored is fitted, the water is supplied from the water tank into the housing of the steam generating device. When, in the housing, a predetermined water level is achieved with the water level sensor, the water supply is stopped, and the water heated by the steam generating heater is esteamated to generate steam. The steam generated by the steam generating device is supplied to the heating chamber, and the item to be cooked within the heating chamber is cooked with the steam.

The water supplied to the steam generating device contains impurities; the water is esteamated by heating with the steam generating heater, and scale is attached to the housing and the water level sensor. Hence, when the water level within the housing becomes lower than a predetermined water level, the water level sensor is stopped. Thus, it is possible to reduce the attachment of scale to the water level sensor and prevent the water level sensor from performing erroneous detection.

On the other hand, when the scale is attached to the housing, the thermal conductivity thereof is reduced, the amount of steam generated is reduced and the performance of the steam generating device is reduced. Since tap water in Japan is mainly soft water, the amount of scale attached is low, and the performance is only slightly reduced in the useful life of the steam cooker (for example, 10 years).

However, since, outside Japan, tap water or mineral water that is hard water is often supplied to the water supply tank, the performance of the steam generating device is significantly reduced by the attachment of scale. Hence, it is necessary to periodically clean, with citric acid or the like, the inside of the housing of the steam generating device. Here, a user measures, with a test paper, the hardness of water stored in the water tank, and performs an input operation to set the measured water hardness. Then, a notification of a time for cleaning the steam generating device based on an interval corresponding to the water hardness is provided to the user by display or the like, and the steam generating device is cleaned.

RELATED ART DOCUMENT

Patent Document

Patent document 1: JP-A-2005-337627 (Pages 6-14 and FIG. 1)

SUMMARY OF THE INVENTION

Problems to be Solved by the Invention

However, in the conventional steam cooker described above, in order for the user to find the time for cleaning the steam generating device, it is necessary for the user to perform complicated operations such as the measurement of the hardness and the setting. For this reason, the convenience of the steam cooker is disadvantageously reduced.

An object of the present invention is to provide a steam cooker that can enhance convenience.

Means for Solving the Problem

To achieve the above object, according to the present invention, there is provided a steam cooker including: a heating chamber that stores an item to be cooked; a removable water tank; a steam generating device that includes a housing to which water is supplied from the water tank and that heats, with a steam generating heater, the water within the housing and supplies steam to the heating chamber; and a hardness detection portion that includes a plurality of electrodes which are immersed in water within the water tank or a water storage portion coupled to the water tank and that detects a hardness of the water within the water tank by a resistance between the electrodes, in which, when the hardness of the water within the water tank that is detected by the hardness detection portion is high, an interval of cleaning of the steam generating device is shorter than an interval set when the hardness detected by the hardness detection portion is low.

In this configuration, the water tank storing tap water or the like is fitted, and thus the electrodes of the hardness detection portion are immersed in the water within the water tank or the water storage portion coupled to the water tank. The hardness of the water within the water tank is detected by the resistance between the plurality of electrodes. When the cooking is started, the water is supplied from the water tank to the housing of the steam generating device. When the water level within the housing reaches a predetermined water level, the supply of the water is stopped, and the water heated by the steam generating heater is esteamated to generate steam. The steam generated by the steam generating device is supplied to the heating chamber, and the item to be cooked within the heating chamber is cooked with the steam. When the hardness of the water within the water tank that is detected by the hardness detection portion is high, the interval of the cleaning of the steam generating device is set shorter than an interval set when the hardness detected by the hardness detection portion is low.

According to the present invention, in the steam cooker configured as described above, the water level of the water tank is detected by continuity between the electrodes. In this configuration, when the electrodes that are immersed in the water within the water tank or the water storage portion are electrically discontinuous, the amount of water in the water tank is determined to be insufficient, and, for example, the steam cooker is placed on standby for starting the cooking.

According to the present invention, in the steam cooker configured as described above, when the total of the product of the hardness of the water within the water tank and the drive time of the steam generating device exceeds a predetermined value, the cleaning time of the steam generating device is determined to arrive. According to the present invention, the steam cooker configured as described above includes a notification portion that provides a notification of a cleaning time of the steam generating device. In this configuration, when the drive time of the steam generating device reaches the cleaning time determined according to the hardness of the water within the water tank, a notification of the cleaning time is provided to a user by display, sound or the like with the notification portion.

Advantages of the Invention

According to the present invention, since a hardness detection portion includes a plurality of electrodes which are immersed in water within a water tank or a water storage portion coupled to the water tank and detects the hardness of the water within the water tank by a resistance between the electrodes, and, when the hardness of the water within the water tank is high, the interval of cleaning of the steam generating device is set shorter than an interval set when the hardness is low, it is possible to clean the steam generating device according to the hardness of the water within the water tank without complicated operations being performed by a user. It is therefore possible to enhance the convenience of the steam cooker.

DETAILED DESCRIPTION OF THE INVENTION

Figure 1:
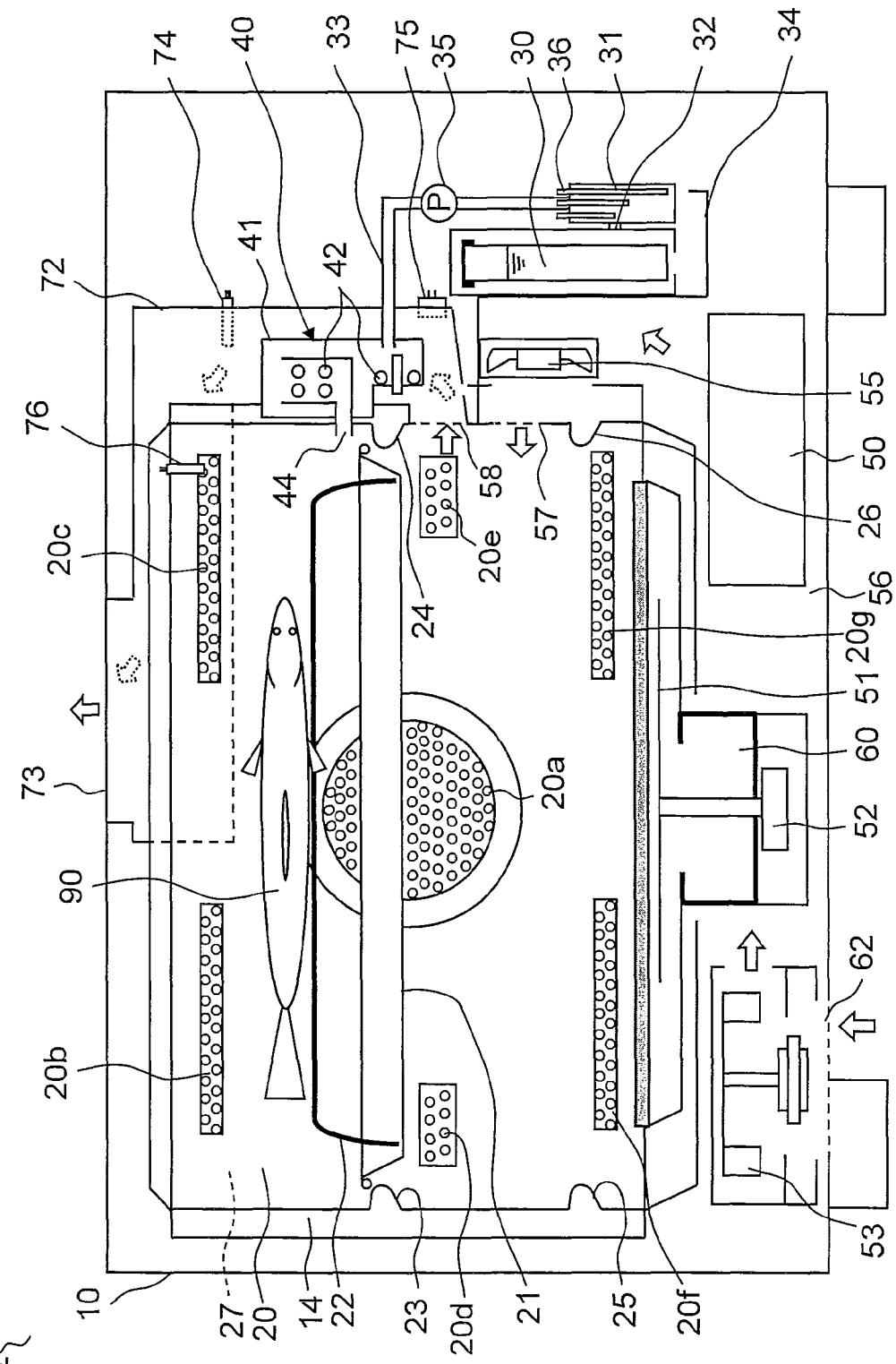
[FIG. 1] A front cross-sectional view showing a steam cooker according to an embodiment of the present invention.

An embodiment of the present invention will be described below with reference to accompanying drawings. FIG. 1 is a front cross-sectional view showing a steam cooker according to an embodiment of the present invention. The steam cooker 1 includes, within a body enclosure 10, a heating chamber 20 that stores an item to be cooked 90. The heating chamber 20 is box-shaped whose front surface is open and is opened and closed by a door (unillustrated). A heat insulator 14 is provided on the perimeter surface of the heating chamber 20, and a temperature sensor 76 is provided on the ceiling surface within the heating chamber 20.

On the left side wall of the heating chamber 20, protrusion portions 23 and 25 are vertically provided; on the right side wall, protrusion portions 24 and 26 are provided at the same height as the protrusion portions 23 and 25, respectively. Between the protrusion portions 23 and 24 or between the protrusion portions 25 and 26, a tray 21 having a placement net 22 on which the item to be cooked 90 is placed is put.

A circulation duct 27 is provided behind the heating chamber 20. In the circulation duct 27, there are provided an inlet 20a that is open at the middle portion of the back surface of the heating chamber 20 and outlets 20b, 20c, 20d, 20e, 20f and 20g that are open in the perimeter portion of the back surface. Within the circulation duct 27, there are provided a circulation fan 28 (see FIG. 3) and a heater 29 (see FIG. 3). The circulation fan 28 and the heater 29 are driven, and thus steam and air within the heating chamber 20 flow into the circulation duct 27 through the inlet 20a, and they are heated and are discharged through the outlets 20b to 20g.

Below the heating chamber 20, there is provided an outside air inflow duct 56 that includes a cooling fan 53, a waveguide 60 and a magnetron 50. In the outside air inflow duct 56, an outside air inflow port 62 is open in the lower surface of the body enclosure 10, and the cooling fan 53 is arranged to face the outside air inflow port 62. The magnetron 50 supplies microwaves into the heating chamber 20 through the waveguide 60. Thus, it is possible to heat the item to be cooked 90 with the microwaves. In the waveguide 60, an antenna 51 that is rotated by an antenna motor 52 is provided, and the microwaves supplied to the heating chamber 20 are made uniform.

In the right side wall of the heating chamber 20, there are provided an intake port 57 and an exhaust port 58. In a position within the outside air inflow duct 56 that faces the intake port 57, an intake fan 55 is provided. The outside air inflow duct 56 is separated by a separation plate 34 from the right upper portion of the heating chamber 20. The exhaust port 58 communicates with an exhaust duct 72 whose open portion 73 is open to the upper surface of the body enclosure 10. The exhaust duct 72 is provided with a humidity sensor 75 and a temperature sensor 74.

Above the separation plate 34 on the right side of the heating chamber 20, a removable water tank 30 is provided. A water storage portion 31 is provided next to the water tank 30. The water storage portion 31 is coupled to the water tank 30 through a communication passage 32 via a water stop valve (unillustrated) provided on the side of the back surface of the water tank 30; when the water tank 30 is fitted, the water within the water tank 30 flows in.

Figure 2:
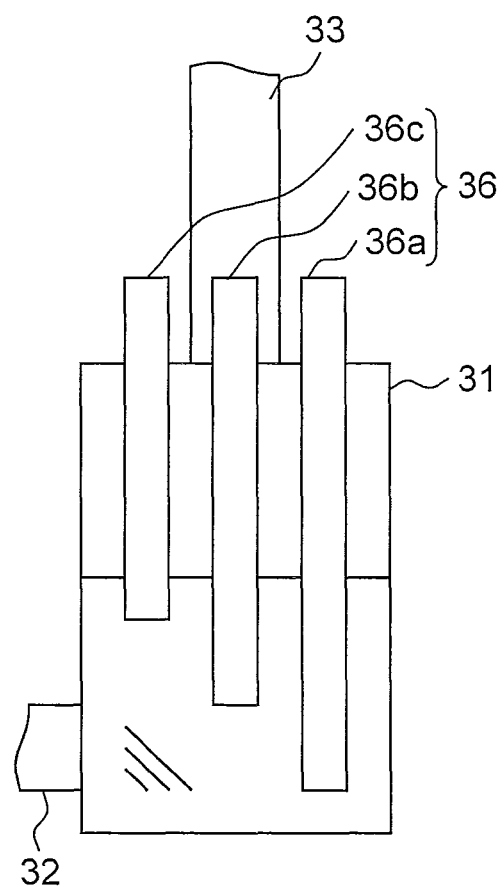
[FIG. 2] A front cross-sectional view showing a water storage portion of the steam cooker according to the embodiment of the present invention.

FIG. 2 shows a front cross-sectional view of the water storage portion 31. In the water storage portion 31, there is provided a water level sensor 36 that is immersed in the water passed from the water tank 30 and that detects the water level. The water level sensor 36 has electrodes 36a, 36b and 36c in descending order of depth of immersion; the water level of the water storage portion 31 is detected by continuity between the electrodes 36a, 36b and 36c.

For example, when the electrodes 36a and 36c become electrically discontinuous, a notification of lack of water is provided by a display portion 4 (see FIG. 3) or the like; when the notification is provided before the start of cooking, the steam cooker 1 is placed on standby for starting the cooking. When the electrodes 36a and 36b become electrically discontinuous, for example, the cooking is temporarily stopped.

A resistance between the electrodes 36a and 36b of the water level sensor 36 or between the electrodes 36a and 36c is detected, and thus the hardness of water in the water tank 30 is detected. The hardness of water is indicated by the content of $CaCo_3$; the unit thereof is ppm, mg/L or dH. Since, as the hardness of water becomes higher, its electrical conductivity is increased, its resistance is decreased.

Hence, a relationship between the hardness and the resistance is previously stored in a storage portion 5 (see FIG. 3), and the hardness is derived from a resistance detected by the water level sensor 36. Therefore, the water level sensor 36 is configured to include a hardness detection portion that detects the hardness of water in the water tank 30. The water level sensor 36 may be provided on the upper surface of the water tank 30, and a terminal portion that makes contact with the electrodes 36a, 36b and 36c when the water tank 30 is fitted may be provided in the body enclosure 10.

In FIG. 1, a steam generating device 40 is provided in an upper portion of the right side wall of the heating chamber 20. In the steam generating device 40, a steam generating heater 42 is provided within a metallic housing 41. A water supply pipe 33 that is extended from the water storage portion 31 is connected to the housing 41; a discharge port 44 that faces the heating chamber 20 is open.

A water supply pump 35 that is provided in the path of the water supply pipe 33 is driven, and thus the water is supplied from the water storage portion 31 into the housing 41. The water within the housing 41 is heated by the steam generating heater 42 and is thereby esteamated, and the steam is discharged through the discharge port 44 into the heating chamber 20. Thus, it is possible to cook the item to be cooked 90 with the saturated steam or the superheated steam.

Figure 3:
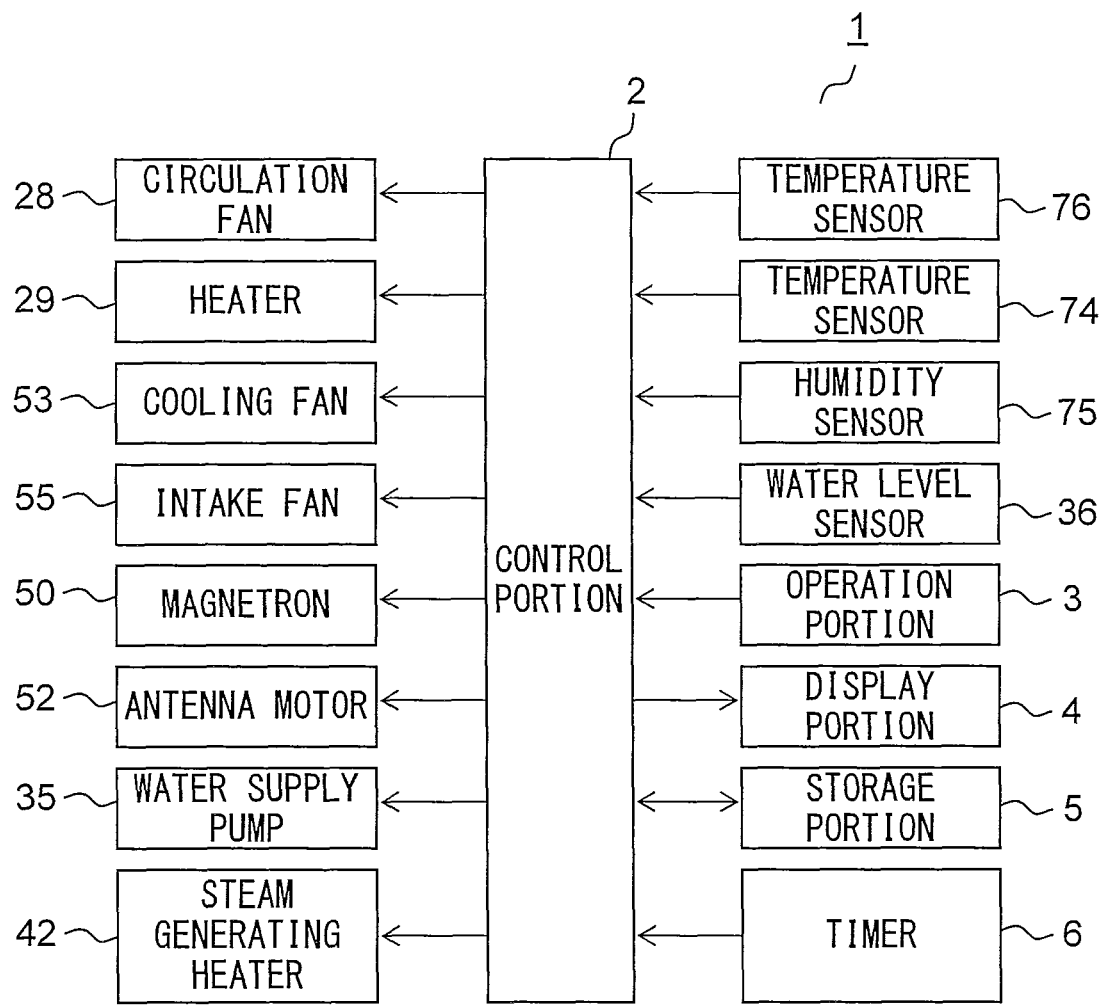
[FIG. 3] A block diagram showing the configuration of the steam cooker according to the embodiment of the present invention.

FIG. 3 is a block diagram showing the configuration of the steam cooker 1. The steam cooker 1 includes a control portion 2 that controls individual portions. To the control portion 2 are connected the circulation fan 28, the heater 29, the cooling fan 53, the intake fan 55, the magnetron 50, the antenna motor 52, the water supply pump 35, the steam generating heater 42, the temperature sensors 74 and 76, the humidity sensor 75, the water level sensor 36, an operation portion 3, the display portion 4, the storage portion 5 and a timer 6.

The operation portion 3 is provided in the door (unillustrated) of the body enclosure 10; the operation portion 3 performs an operation of selection in a cooking menu or the like. The display portion 4 is formed with a liquid crystal panel and the like provided in the door (unillustrated) of the body enclosure 10; the display portion 4 displays an item selected by the operation portion 3, the progress status of the cooking, the details of a notification to the user and the like. The storage portion 5 is formed with a ROM, a RAM and the like; the storage portion 5 stores a program for operating the steam cooker 1, a database of the cooking menu and the like, and performs temporary storage in a computation performed by the control portion 2. The timer 6 measures a cooking time and the total time of usage.

In the steam cooker 1 configured as described, when cooking (range cooking) using the microwaves is started, the magnetron 50 and the antenna motor 52 are driven. The cooling fan 53 and the intake fan 55 are also driven. The microwaves are supplied by the magnetron 50 through the waveguide 60 into the heating chamber 20, and thus the item to be cooked 90 is heated with the microwaves.

The cooling fan 53 makes outside air flow into the outside air inflow duct 56 through the outside air inflow port 62. The outside air that has flowed into the outside air inflow duct 56 cools the magnetron 50 and thus is increased in temperature, and is supplied by the intake fan 55 through the intake port 57 to the heating chamber 20. By the intake of the air through the intake port 57, the air within the heating chamber 20 flows through the exhaust port 58 into the exhaust duct 72, and is discharged through the open portion 73 of the ceiling surface to the outside.

When steam is produced from the item to be cooked 90 by the heating with the microwaves and the humidity within the heating chamber 20 reaches a predetermined humidity, a time when the cooking is completed is determined by detection with the humidity sensor 75. Thus, the cooking using the microwaves is completed. When an abnormally high temperature within the heating chamber 20 is detected with the temperature sensors 74 and 76, the cooking is interrupted.

When cooking (oven cooking) using a hot air is started, the circulation fan 28 and the heater 29 are driven. The air within the heating chamber 20 flows into the circulation duct 27 through the inlet 20a, and is heated by the heater 29 and is discharged through the outlets 20b to 20g. In this way, the air within the heating chamber 20 is maintained at a predetermined temperature and is circulated, and the item to be cooked 90 is cooked. When the timer 6 detects that the cooking time has elapsed, the cooking is completed. When an abnormally high temperature within the heating chamber 20 is detected with the temperature sensor 76, the cooking is interrupted.

Figure 4:
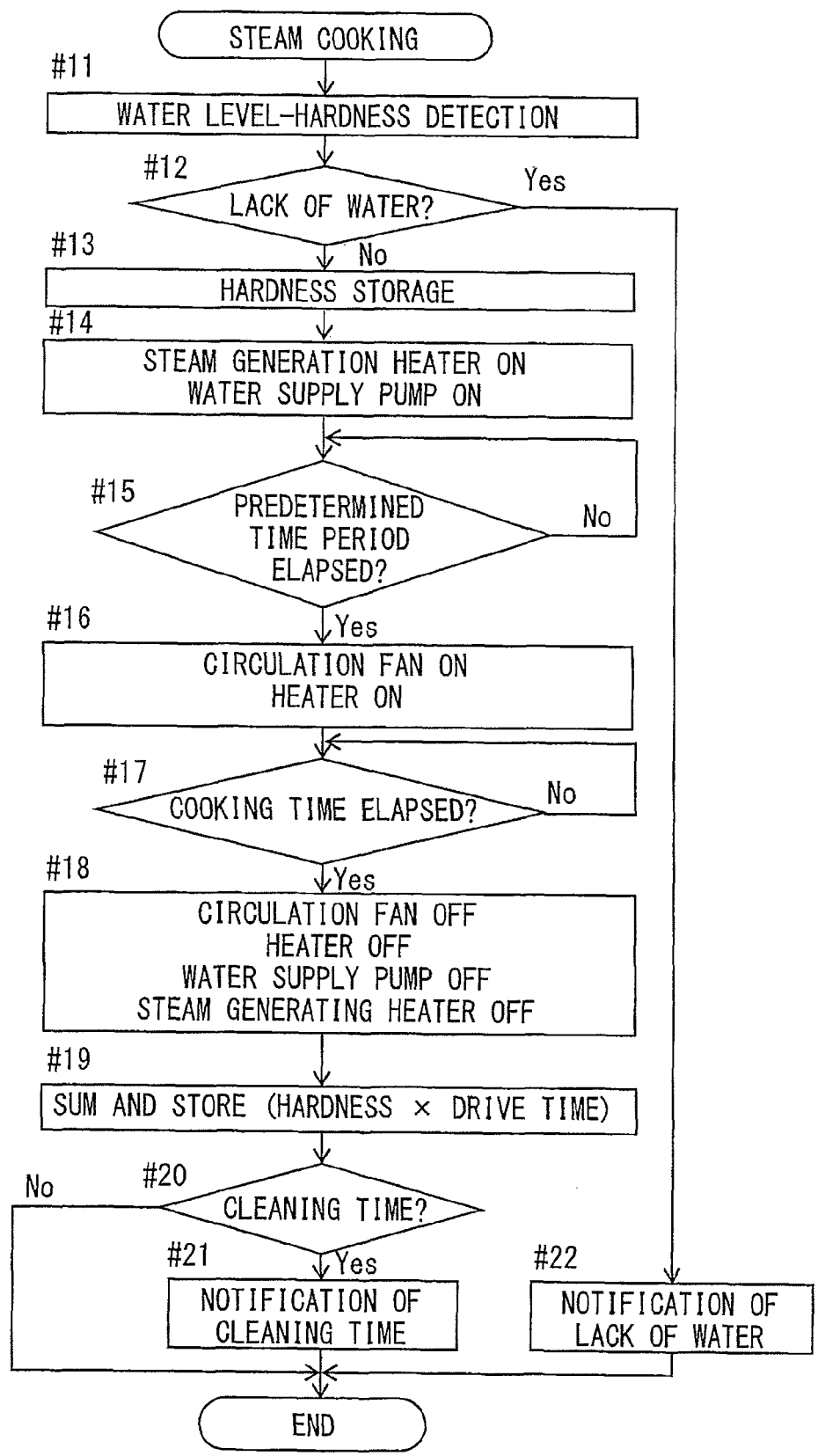
[FIG. 4] A flowchart showing the operation of the steam cooker according to the embodiment of the present invention.

FIG. 4 is a flowchart showing an operation of cooking (steam cooking) using steam. When the water tank 30 is fitted, and the steam cooking is started, in step #11, the water level sensor 36 detects the water level of the water tank 30 and the hardness. In step #12, whether or not the amount of water in the water tank 30 is insufficient is determined.

If the amount of water in the water tank 30 is insufficient, the process moves to step #22 where a notification of lack of water is provided by the display portion 4, and the process is completed. If the amount of water in the water tank 30 is sufficient, the process moves to step #13. In step #13, the hardness detected in step #11 is stored in the storage portion 5.

In step #14, the steam generating heater 42 and the water supply pump 35 are driven. Thus, the water in the water storage portion 31 is supplied into the housing 41 of the steam generating device 40 at a predetermined flow rate, and the steam generated by heating with the steam generating heater 42 is supplied to the heating chamber 20. In step #15, the steam cooker 1 is placed on standby for a predetermined time period, and, when the steam fills the heating chamber 20, the process moves to step #16.

In step #16, the circulation fan 28 and the heater 29 are driven. The steam within the heating chamber 20 flows through the inlet 20a into the circulation duct 27, and the steam is heated by the heater 29 and is discharged through the outlets 20b to 20g. In this way, the steam within the heating chamber 20 is maintained at a predetermined temperature and is circulated, and the item to be cooked 90 is cooked with the saturated steam or the superheated steam.

In step #17, the steam cooker 1 is placed on standby until the cooking time elapses. When the cooking time has elapsed, in step #18, the circulation fan 28, the heater 29, the water supply pump 35 and the steam generating heater 42 are stopped.

In step #19, a total obtained by summing the product of the water hardness stored in step #13 and the drive time of the steam generating device 40 measured by the timer 6 and a predetermined variable T is stored. Each time the cooking is performed, the variable T is stored as a value obtained by summing the previous total value of the product and the current product. In step #20, whether or not the variable T exceeds a predetermined value indicating the cleaning time and the cleaning time has arrived is determined. Specifically, when water having a high hardness is used, even if a time period during the steam is generated is short, the cleaning time arrives, with the result that the interval of the cleaning is decreased. When water having a low hardness is used, if the time period during the steam is generated is short, the cleaning time does not arrive, with the result that the interval of the cleaning is increased.

If the cleaning time does not arrive, the process is completed whereas, if the cleaning time arrives, in step #21, a notification of the arrival of the cleaning time is provided by the display portion 4, and the process is completed. That is, the display portion 4 is configured to include a notification portion that provides a notification of the cleaning time of the steam generating device 40. In this way, the user finds the cleaning time of the steam generating device 40, and performs a predetermined operation of cleaning the steam generating device 40 with citric acid or the like. Here, the variable T is reset. Consequently, it is possible to remove the scale of the steam generating device 40 and maintain the performance.

In the present embodiment, the hardness detection portion is provided that has a plurality of electrodes 36a to 36c which are immersed in water within the water storage portion 31 coupled to the water tank 30, and the hardness of the water within the water tank 30 is detected by the resistance between the electrodes 36a to 36c. When the hardness of the water within the water tank 30 is high, the interval of cleaning of the steam generating device 40 is set shorter than an interval set when the hardness is low, and a notification of the cleaning time is provided by the display portion 4 (notification portion). Thus, it is possible to clean the steam generating device 40 according to the hardness of the water within the water tank 30 without complicated operations being performed by the user. It is therefore possible to enhance the convenience of the steam cooker 1.

As described above, the water hardness may be detected by immersing the electrodes 36a to 36c in the water within the water tank 30. The notification of the cleaning time may be provided such as by producing sound or turning on a warning light (for example, an LED).

Since the water level of the water tank 30 is detected by continuity between the electrodes 36a to 36c, it is not necessary to provide the hardness detection portion in addition to the water level sensor 36, and thus it is possible to reduce the cost of the steam cooker 1.

Since, in step #20, when the total of the product of the hardness of the water within the water tank 30 and the drive time of the steam generating device 40 exceeds the predetermined value, the cleaning time of the steam generating device 40 is determined to arrive, it is possible to accurately determine the cleaning time even if the hardness of the water stored in the water tank 30 is changed each time the cooking is performed.

Industrial Applicability

With the present invention, it is possible to utilize a steam cooker that cooks, with steam, an item to be cooked.

List of Reference Symbols
- 1 Steam cooker
- 2 Control portion
- 3 Operation portion
- 4 Display portion
- 5 Storage portion
- 6 Timer
- 10 Body enclosure
- 20 Heating chamber
- 20a Inlet
- 20b to 20g Outlets
- 21 Tray
- 27 Circulation duct
- 28 Circulation fan
- 29 Heater
- 30 Water tank
- 31 Water storage portion
- 35 Water supply pump
- 36 Water level sensor (hardness detection portion)
- 36a to 36c Electrodes
- 40 Steam generating device
- 41 Housing
- 42 Steam generating heater
- 44 Discharge port
- 50 Magnetron
- 51 Antenna
- 53 Cooling fan
- 55 Intake fan
- 56 Outside air inflow duct
- 57 Intake port
- 58 Exhaust port
- 60 Waveguide
- 72 Exhaust duct
- 74 and 76 Temperature sensors
- 75 Humidity sensor
- 90 Item to be cooked

The invention claimed is:

1. A steam cooker comprising:
a heating chamber that stores an item to be cooked;
a removable water tank;
a steam generating device that includes a housing to which water is supplied from the water tank and that heats, with a steam generating heater, the water within the housing and supplies steam to the heating chamber;
a sensor that includes a plurality of electrodes which are immersed in water within the water tank or a water storage portion coupled to the water tank and that detects a hardness of the water within the water tank by a resistance between the electrodes;
a storage portion that stores values based on the hardness of the water within the water tank and a record of use of the steam generating device; and
a notification portion that provides a notification that a total of the values exceeds a predetermined value,
wherein each of the electrodes has a different depth of immersion, and the sensor detects a water level of the water tank by continuity between the electrodes.

2. The steam cooker of claim 1, further comprising:
a timer that measures a drive time of the steam generating device,
wherein, the storage portion stores a total of a product of the hardness of the water within the water tank and the drive time of the steam generating device exceeds a predetermined value, and
the notification portion provides a notification that the total exceeds the predetermined value.

3. The steam cooker of claim 1,
wherein sensor detects the hardness of the water each time steam cooking is performed.

4. The steam cooker of claim 1,
wherein the sensor includes three electrodes.

* * * * *